(12) United States Patent
Li

(10) Patent No.: US 11,994,400 B2
(45) Date of Patent: *May 28, 2024

(54) SYSTEMS AND METHODS FOR ASSESSMENT OF A RIDESHARE TRIP

(71) Applicant: BlueOwl, LLC, San Francisco, CA (US)

(72) Inventor: Kaming Li, San Francisco, CA (US)

(73) Assignee: BLUEOWL, LLC, San Francisco, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 17/576,293

(22) Filed: Jan. 14, 2022

(65) Prior Publication Data
US 2022/0136844 A1   May 5, 2022

Related U.S. Application Data

(63) Continuation of application No. 16/883,620, filed on May 26, 2020, now Pat. No. 11,248,920, which is a (Continued)

(51) Int. Cl.
*G01C 21/34* (2006.01)
*G06Q 10/02* (2012.01)
(Continued)

(52) U.S. Cl.
CPC ....... *G01C 21/3438* (2013.01); *G06Q 10/025* (2013.01); *G06Q 10/047* (2013.01);
(Continued)

(58) Field of Classification Search
CPC ............ G06Q 50/30–32; G06Q 10/06; G06Q 10/063112; G06Q 50/40; G06Q 50/43;
(Continued)

(56) References Cited

U.S. PATENT DOCUMENTS 9,086,948 B1 * 7/2015 Slusar ................. G06Q 40/08
9,959,512 B2   5/2018 Camp et al.
(Continued)

OTHER PUBLICATIONS

"Assessing Driving Behavior in Public Transportation Through Mobile Crowd Sensing: A Concept Proposal for Macau Public Transportation System" by Ma et al, published in 2016 10th International Conference on Innovative Mobile and Internet Services in Ubiquitous Computing (Year: 2016).
(Continued)

*Primary Examiner* — Brendan Y Higa
(74) *Attorney, Agent, or Firm* — BRYAN CAVE LEIGHTON PAISNER LLP

(57) ABSTRACT

Techniques are disclosed for objectively assessing the driving performance of rideshare drivers and/or vehicles. The techniques include collecting data from various sources to aggregate trip data for several drivers and passengers over several ridesharing trips. This data may include telematics data collected from several passengers and/or drivers during each of their respective ridesharing trips, which indicates various aspects associated with operation of the vehicle. Each driver may then be correlated to his own set of trip data, such that a driving assessment may be made for each individual driver. When a new user subsequently requests a ride via a ridesharing provider, this driver assessment may be made available to the user, thereby providing the user with an objective assessment of the driver prior to the start of the scheduled ride.

26 Claims, 5 Drawing Sheets

Related U.S. Application Data continuation of application No. 15/653,884, filed on Jul. 19, 2017, now Pat. No. 10,697,784.

(51) Int. Cl.
| | |
|---|---|
| *G06Q 10/047* | (2023.01) |
| *G06Q 10/06* | (2023.01) |
| *G06Q 10/0631* | (2023.01) |
| *G06Q 50/40* | (2024.01) |
| *G06Q 50/47* | (2024.01) |
| *G08G 1/00* | (2006.01) |
| *H04L 67/00* | (2022.01) |
| *H04L 67/50* | (2022.01) |
| *H04L 67/52* | (2022.01) |
| *H04W 4/02* | (2018.01) |

(52) U.S. Cl.
CPC ..... *G06Q 10/06* (2013.01); *G06Q 10/063112* (2013.01); *G06Q 50/40* (2024.01); *G06Q 50/47* (2024.01); *G08G 1/202* (2013.01); *H04L 67/00* (2013.01); *H04L 67/52* (2022.05); *H04L 67/535* (2022.05); *H04W 4/027* (2013.01)

(58) Field of Classification Search
CPC ............. G06Q 50/47; G08G 1/20–202; G01C 21/3484–3492; G01C 21/26; G01C 21/343–3438; G07B 13/02–10
See application file for complete search history.

(56) References Cited

U.S. PATENT DOCUMENTS

| | | | |
|---|---|---|---|
| 10,163,274 B1 | 12/2018 | Brinkmann et al. | |
| 10,445,758 B1 | 10/2019 | Bryer et al. | |
| 10,643,477 B2* | 5/2020 | Hodges ................. | G07C 5/008 |
| 2007/0027593 A1 | 2/2007 | Shah et al. | |
| 2007/0268158 A1 | 11/2007 | Gunderson et al. | |
| 2011/0153629 A1* | 6/2011 | Lehmann ............... | G06Q 30/06 |
| | | | 707/E17.014 |
| 2012/0089423 A1 | 4/2012 | Tamir et al. | |
| 2013/0073112 A1* | 3/2013 | Phelan .................... | G07C 5/02 |
| | | | 701/1 |
| 2013/0141249 A1 | 6/2013 | Pearlman et al. | |
| 2014/0058761 A1* | 2/2014 | Freiberger ............. | G06Q 50/30 |
| | | | 705/4 |
| 2014/0087335 A1 | 3/2014 | Phelan et al. | |
| 2014/0309849 A1 | 10/2014 | Ricci | |
| 2015/0081362 A1* | 3/2015 | Chadwick ............. | G06Q 50/30 |
| | | | 705/7.14 |
| 2015/0094021 A1 | 4/2015 | Su | |
| 2016/0171521 A1* | 6/2016 | Ramirez ................ | B60K 35/00 |
| | | | 701/409 |
| 2016/0232475 A1 | 8/2016 | Kuehnle et al. | |
| 2016/0358129 A1 | 12/2016 | Walton et al. | |
| 2016/0373473 A1 | 12/2016 | Truong et al. | |
| 2017/0011324 A1 | 1/2017 | Truong et al. | |
| 2017/0039890 A1 | 2/2017 | Truong et al. | |
| 2017/0061825 A1 | 3/2017 | Payne et al. | |
| 2017/0075536 A1 | 3/2017 | Cho et al. | |
| 2017/0124506 A1 | 5/2017 | Khan | |
| 2017/0186054 A1 | 6/2017 | Fish et al. | |
| 2017/0262770 A1 | 9/2017 | Purdy et al. | |
| 2018/0039917 A1 | 2/2018 | Buttolo et al. | |
| 2018/0060754 A1 | 3/2018 | Guo et al. | |
| 2018/0089605 A1 | 3/2018 | Poornachandran et al. | |
| 2018/0096629 A1 | 4/2018 | Paul et al. | |
| 2018/0174484 A1 | 6/2018 | Bradley et al. | |
| 2018/0293521 A1* | 10/2018 | Akselrod ............. | G06Q 10/025 |
| 2019/0016343 A1* | 1/2019 | Allen ..................... | G06Q 50/40 |
| 2019/0019122 A1* | 1/2019 | Allen .................... | B60W 40/09 |
| 2019/0130663 A1* | 5/2019 | Li ............................ | G08G 1/01 |

OTHER PUBLICATIONS

"RESen: Sensing and Evaluating the Riding Experience based on Crowdsourcing by Smart Phones" by Song et al, published in 2012 8th International Conference on Mobile Ad-hoc and Sensor Networks (Year: 2012).

"Riding Quality Evaluation through Mobile Crowd Sensing" by Tan etal, published in 2016 IEEE International Conference on Pervasive Computing and Communications (PerCom) (Year: 2016).

Google scholar search results—driver assessment mobile crowd sensing (Year: 2019).

* cited by examiner

| Passenger 1 | Ridesharing Trips | | | | |
|---|---|---|---|---|---|
| | Trip Data (1) | Trip Data (2) | Trip Data (3) | Trip Data (4) | Trip Data (5) |
| | Driver ID: 10001 | Driver ID: 10002 | Driver ID: 10003 | Driver ID: 10004 | Driver ID: 10005 |
| | Start time | Start time | Start time | Start time | Start time |
| | Stop Time | Stop Time | Stop Time | Stop Time | Stop Time |
| | Sensor Data | Sensor Data | Sensor Data | Sensor Data | Sensor Data |
| | Route Data | Route Data | Route Data | Route Data | Route Data |

401　401A

| Passenger 2 | Ridesharing Trips | | | | |
|---|---|---|---|---|---|
| | Trip Data (1) | Trip Data (2) | Trip Data (3) | Trip Data (4) | Trip Data (5) |
| | Driver ID: 10010 | Driver ID: 10020 | Driver ID: 10001 | Driver ID: 10030 | Driver ID: 10040 |
| | Start time | Start time | Start time | Start time | Start time |
| | Stop Time | Stop Time | Stop Time | Stop Time | Stop Time |
| | Sensor Data | Sensor Data | Sensor Data | Sensor Data | Sensor Data |
| | Route Data | Route Data | Route Data | Route Data | Route Data |

402　402A

| Passenger 3 | Ridesharing Trips | | | | |
|---|---|---|---|---|---|
| | Trip Data (1) | Trip Data (2) | Trip Data (3) | Trip Data (4) | Trip Data (5) |
| | Driver ID: 10011 | Driver ID: 10001 | Driver ID: 10021 | Driver ID: 10031 | Driver ID: 10041 |
| | Start time | Start time | Start time | Start time | Start time |
| | Stop Time | Stop Time | Stop Time | Stop Time | Stop Time |
| | Sensor Data | Sensor Data | Sensor Data | Sensor Data | Sensor Data |
| | Route Data | Route Data | Route Data | Route Data | Route Data |

403　403A

| Passenger 4 | Ridesharing Trips | | | | |
|---|---|---|---|---|---|
| | Trip Data (1) | Trip Data (2) | Trip Data (3) | Trip Data (4) | Trip Data (5) |
| | Driver ID: 10012 | Driver ID: 10001 | Driver ID: 10022 | Driver ID: 10032 | Driver ID: 10042 |
| | Start time | Start time | Start time | Start time | Start time |
| | Stop Time | Stop Time | Stop Time | Stop Time | Stop Time |
| | Sensor Data | Sensor Data | Sensor Data | Sensor Data | Sensor Data |
| | Route Data | Route Data | Route Data | Route Data | Route Data |

404　404A

| Passenger 5 | Ridesharing Trips | | | | |
|---|---|---|---|---|---|
| | Trip Data (1) | Trip Data (2) | Trip Data (3) | Trip Data (4) | Trip Data (5) |
| | Driver ID: 10013 | Driver ID: 10014 | Driver ID: 10015 | Driver ID: 10016 | Driver ID: 10001 |
| | Start time | Start time | Start time | Start time | Start time |
| | Stop Time | Stop Time | Stop Time | Stop Time | Stop Time |
| | Sensor Data | Sensor Data | Sensor Data | Sensor Data | Sensor Data |
| | Route Data | Route Data | Route Data | Route Data | Route Data |

SYSTEMS AND METHODS FOR ASSESSMENT OF A RIDESHARE TRIP

This application is a continuation of U.S. patent application Ser. No. 16/883,620, filed May 26, 2020, which is a continuation of U.S. application Ser. No. 15/653,884, filed Jul. 19, 2017, both applications being incorporated by reference herein for all purposes.

FIELD

The present disclosure is directed to an assessment of a rideshare trip. More particularly, the present disclosure is directed to determining an objective driver assessment for rideshare drivers and vehicles using telematics data.

BACKGROUND

Today, there are various ridesharing providers that provide ridesharing services for passengers. Typically, upon completion of a trip, a passenger is provided with an option to rate the completed ride based on the experience of the user. Therefore, any driver ratings generated in this manner are done in a subjective, rather than an objective manner. As a result, current rideshare rating systems suffer from several drawbacks and do not provide an accurate and reliable means to measure driver safety and vehicle operation.

SUMMARY

Because current ridesharing rating systems provide driver feedback in the form of subjective rating scores, this may reflect other aspects of the driving experience other than the driver's actual operation of the vehicle during the ride. For instance, a passenger may not like a driver's demeanor or choice of music during the ride, and give the driver a poor rating when the driver was actually driving safely. To remedy this, the aspects described herein are directed to providing an objective driver rating system that collects telematics data indicating one or more aspects associated with the operation of the vehicle such as changes in acceleration, braking, cornering, speeding, etc. This telematics data may be generated, for example, via each passenger's smartphone and/or the vehicle itself, which is transmitted to a remote external computing device, such as a back-end sever, where it is stored as trip data with other details about each trip such as the identification of the driver and passenger. To calculate a driver assessment for an individual driver, the driver may be correlated to his or her own sets of trip data, i.e., sets of sensor data may be identified for different passengers driving with the same driver. A driving score may then be calculated using a driver's trip data from several historic trips and displayed to new passengers, which represents an objective rating that reflects that driver's previous driving performance.

In one aspect, a rideshare assessment server is disclosed. The rideshare assessment server may include a communication unit configured to receive, via a computer network, (i) information indicative of a plurality of historic ridesharing trips associated with a driver of a vehicle, and (ii) sensor data indicating one or more aspects associated with operation of the vehicle during each of the historic ridesharing trips when rideshare passengers were being driven by the driver. The rideshare assessment server may also include a processing unit configured to determine a driver assessment for the driver based on the one or more aspects associated with operation of the vehicle during each of the historic ridesharing trips. The communication unit may be further configured to receive, via the computer network, information indicative of a scheduled ride with the driver and, in response to receipt of the scheduled ride, to transmit, via the computer network, a notification for display that includes the driver assessment. The rideshare assessment server may include additional, less, or alternate components, including those discussed elsewhere herein.

In another aspect, a computer-implemented method for assessing driving performance of a rideshare is disclosed. The computer-implemented method may include receiving, by one or more processors, sensor data collected via a plurality of mobile computing devices. The computer-implemented method may also include correlating, by the one or more processors, the sensor data to a driver associated with each of a series of historic ridesharing trips. The sensor data, when correlated to the driver, may indicate one or more aspects of vehicle operation during each of the series of historic ridesharing trips when rideshare passengers were being driven by the driver. The computer-implemented method may also include determining, by the one or more processors, a driver assessment of the driver based on the sensor data correlated to the driver. The computer-implemented method may also include receiving, by the one or more processors, information indicative of a requested scheduled ride with one of the plurality of drivers, the information identifying the driver. The computer-implemented method may additionally include transmitting, by the one or more processors, a notification of the driver assessment prior to a start of the scheduled ride. The method may include additional, less, or alternate actions, including those discussed elsewhere herein.

In yet another aspect, a mobile computing device is disclosed. The mobile computing device may include a communication unit configured to receive information indicative of a start and an end of a rideshare trip. The information includes an identification of a driver corresponding to the rideshare trip. The mobile computing device may further include a sensor array configured to capture sensor data corresponding to movement of a vehicle in accordance with the start of a rideshare trip, and to stop capturing sensor data in accordance with the end of the rideshare trip, such that the sensor data is captured while a passenger is in the vehicle during the rideshare trip. The mobile computing device may additionally include a processing unit configured to calculate a driver assessment of the driver based on (i) the captured sensor data, and (ii) the information indicative of the start and the end of the rideshare trip. Furthermore, the communication unit may be configured to transmit the driver assessment to an external computing device. The mobile computing device may include additional, less, or alternate components, including those discussed elsewhere herein.

BRIEF DESCRIPTION OF THE DRAWINGS

FIG. 4 illustrates exemplary information associated of various drivers and rideshare trips, in accordance with embodiments of the present disclosure.

The Figures depict aspects of the present invention for purposes of illustration only. One skilled in the art will readily recognize from the following discussion that alternate aspects of the structures and methods illustrated herein may be employed without departing from the principles of the invention described herein.

DETAILED DESCRIPTION

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

System Overview

Figure 1:
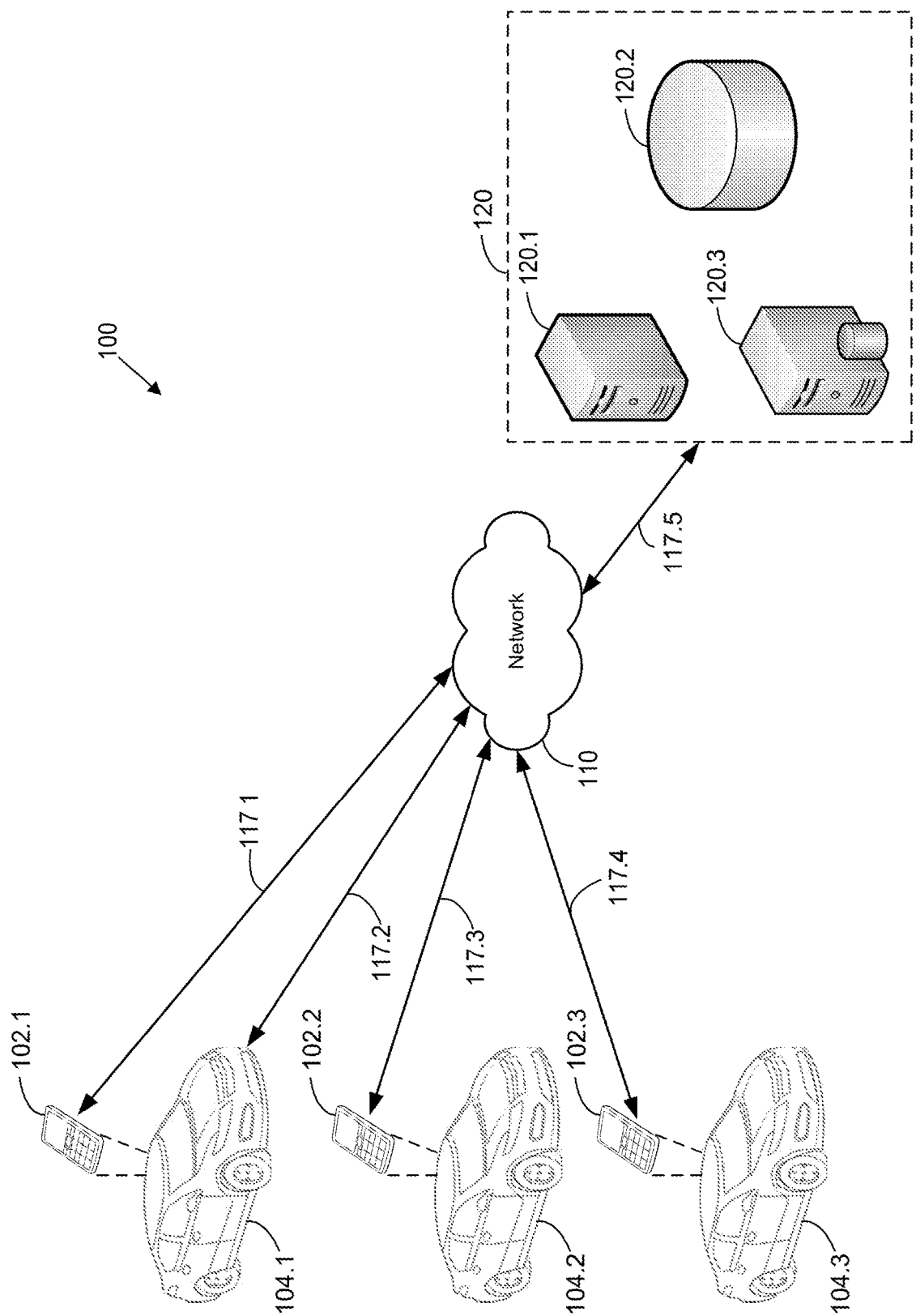
FIG. 1 illustrates a block diagram of an exemplary system 100, in accordance with embodiments of the present disclosure.

Referring now to the Figures, FIG. 1 illustrates a block diagram of an exemplary system 100, in accordance with embodiments of the present disclosure. In various aspects, the system 100 may include one or more client devices 102.1-102.3 and respective vehicles 104.1-104.3, one or more communication networks 110, and any suitable number of back-end computing devices 120, which may include one or more back-end computing devices 120.1-120.3, for example. Moreover, each of the one or more client devices 102.1-102.3 may be associated with a respective user, who are not shown in FIG. 1 for purposes of brevity. Each of these users may also become a ridesharing passenger or a ridesharing driver in one or more of vehicles 104.1-104.3 when a ride is scheduled via any suitable type of ridesharing service, as further discussed herein.

Although FIG. 1 illustrates three client devices 102.1-102.3, three vehicles 104.1-104.3, one communication network 110, and three back-end computing devices 120.1-120.3, it is to be understood that system 100 may include any suitable number of such components. Moreover, system 100 may include additional, less, or alternate components, including those discussed elsewhere herein. For example, although not shown in FIG. 1 for purposes of brevity, back-end computing devices 120 may include one or more computing devices associated with one or more rideshare providers, such as servers, computers, etc., that are implemented by the rideshare providers to implement ridesharing services, as further discussed herein. Furthermore, back-end computing devices 120 may include several hundred components, including a server configured to communicate with several hundred or several thousand client devices 102 and/or vehicles 104, each of which may be operated by a separate user, operator, or driver. To this end, the terms "user," "passenger," "driver," and "operator" may be used interchangeably throughout this disclosure in various contexts.

The various communication links shown in FIG. 1 are shown for ease of explanation, and it will be understood that each of the components implemented via system 100 may be configured to communicate with one another directly and/or indirectly. For example, to facilitate indirect communications, communication network 110 may support communications between one or more client devices 102.1-102.3, one or more vehicles 104.1-104.3, and/or one or more back-end computing devices 120.1-120.3 using any suitable number of wired and/or wireless links, which may be represented as links 117.1-117.5, for example.

For example, communication network 110 may represent any suitable number of nodes, radio frequency links, wireless or digital communication channels (each of which being capable of wireless data transmission), additional wired and/or wireless networks that may facilitate one or more landline connections, internet service provider (ISP) backbone connections, satellite links, public switched telephone network (PSTN), etc. To provide additional examples, the present aspects include communication network 110 being implemented, for example, as a local area network (LAN), a metropolitan area network (MAN), a wide area network (WAN), or any suitable combination of local and/or external network connections. To provide further examples, communications network 110 may include wired telephone and cable hardware, satellite, cellular phone communication networks, base stations, macrocells, femtocells, etc.

In various aspects, each of client devices 102.1-102.3 may be implemented as any suitable type of device, which may be integrated as part of the vehicle 104 in which it is located, or as a portable device separate from the vehicle 104. For example, one or more of client devices 102.1-102.3 may be implemented as a mobile computing device, such as smartphone, or as integrated components, such as on-board vehicle computers. One or more of the vehicles 104.1-104.3 may be human operated, or autonomous or semi-autonomous vehicles, in some embodiments. It should be appreciated that other types of electronic devices and/or mobile devices are envisioned, such as notebook computers, tablets, phablets, GNSS-enabled devices, smart watches, smart glasses, smart bracelets, wearable electronics, PDAs (personal digital assistants), pagers, computing devices configured for wireless communication, etc.

In the present aspects, one or more of the client devices 102.1-102.3 and/or one or more of the vehicles 104.1-104.3 may be configured to measure, generate, collect, store, and/or transmit what is referred to herein as "telematics data" or "sensor data," which are used interchangeably. In some instances, this telematics data may be transmitted while one or more of vehicles 104.1-104.3 is being driven, thus providing data that may be used as the basis for calculating a driver assessment during one or more trips. For example, this telematics data may be transmitted to one or more back-end components 120 to facilitate the calculation of a driving score for each vehicle's respective driver (or, if an autonomous or semi-autonomous vehicle, a driving score for the vehicle itself). The telematics data may be generated, for example, via one or more sensors integrated as part of, or otherwise associated with, one or more of client devices 102.1-102.3 and/or one or more of the vehicles 104.1-104.3, as the case may be.

As used herein, the terms "telematics data" or "sensor data" may refer to any suitable type of information that is indicative of driving behavior, driving safety, and/or driving conditions that may occur while a passenger is taking a ride via a ridesharing service. Furthermore, the telematics data or sensor data may generally refer to any suitable type of information that is indicative of various physical properties, environmental conditions, information associated with one or more ridesharing trips, etc. In various aspects, the telematics data may be used, for example, to identify a particular client device, a particular driver, vehicle, or passenger, driving behavior or habits, road conditions, vehicle locations, a vehicle's movement while being driven, etc., regardless of the particular component or source that generates the telematics data.

For example, the telematics data may include various sensor metrics and/or geographic location data generated by one or more sensors or other suitable components. For instance, the telematics data may include, regardless of the device generating it, sensor metrics or other information indicating changes over time, or instantaneous values indicative of, a vehicle's acceleration, braking, cornering, velocity, and/or otherwise related to any portion of the vehicle's movement. Furthermore, the telematics data may include a timestamp associated with the sampled sensor metrics or other data to allow each sampled data point to be associated with a specific time, thereby facilitating tracking changes in the telematics data. To provide yet another example, the telematics data may include various sensor metrics such as information related to accelerometer sensor measurements (e.g., vehicle acceleration data, velocity data, braking data, etc.), gyroscope sensor measurements (e.g., vehicle steering or cornering data), compass heading measurements, etc. To provide further examples, the telematics data may include information indicative of changes in the geographic location of a particular client device 102.1-102.3 and/or vehicle 104.1-104.3, which may likewise be correlated to a time stamp to identify the movement of a vehicle over time, and thus track its velocity and/or route.

Still further, the telematics data may include information indicative of a usage of a device (e.g., a log indicating when the user was texting or talking on a client device 102 while driving), and/or a battery level associated with client device 102. The telematics data may also include data identifying certain weather conditions, which may be measured by a particular device or retrieved from a separate data source via data communications by that device and included in a telematics data transmission. This list is not meant to be exhaustive or limiting, and it will be understood that other types of information may be included in the telematics data transmission not listed here in accordance with the aspects described herein without departing from the spirit and scope of the present disclosure.

In various aspects, back-end computing devices 120 may include any suitable number of back-end components, which may include any suitable type of components configured to receive, send, store, and/or analyze data to facilitate the functionality of the various embodiments as described herein. For example, as shown in FIG. 1, back-end computing devices 120 may include one or more driver assessment engines 120.1, one or more databases 120.2, and/or one or more database servers 120.3.

In various aspects, driver assessment engine 120.1 may be implemented as any suitable number and/or type of computing device (e.g., one or more computer servers) configured to communicate with other various components such as other back-end components 120.2-120.3, one or more client devices 102.1-102.3, and/or one or more vehicles 104.1-104.3. In the present aspects, driver assessment engine 120.1 may be configured to access data from and/or store data to one or more additional data sources that may be included as one or more of back-end computing devices 120. These data sources may provide data that is utilized by driver assessment engine 120.1 for various purposes.

For example, driver assessment engine 120.1 may use this data to aggregate telematics data, driver assessments, and/or other information from several passengers (e.g., passengers associated with one or more client devices 102.1-102.3), and to determine driver assessments for drivers associated with a collected set of telematics data from several trips. Additionally, driver assessment engine 120.1 may be configured to communicate with one or more client devices 102.1-102.3 prior to the start of a scheduled ride to provide a notification of a driver's assessment for a driver corresponding to the scheduled ride. To provide additional examples, driver assessment engine 120.1 may additionally or alternatively be configured to support and/or work in conjunction with one or more applications installed on one or more client devices 102.1-102.3.

Moreover, the aspects described herein allocate the calculations and functionality for calculating a driver assessment and notifying future passengers with driver assessment engine 120.1 for ease of explanation. However, embodiments include driver assessment engine 120.1 working in conjunction with any suitable number of other components of system 100 to facilitate functionality associated with the aspects of the disclosure as described herein. For example, driver assessment engine 120.1 may work in conjunction with other servers, databases, cloud-based servers, rideshare computer systems, etc., included as part of the one or more back-end computing devices 120. To provide another example, driver assessment engine 120.1 may work in conjunction with one or more client devices 102.1-102.3 and/or one or more vehicles 104.1-104.3. Additionally or alternatively, one or more functions described herein with respect to driver assessment engine 120.1 may also be performed via one or more client devices 102.1-102.3, which may similarly work in conjunction with work one or more of back-end computing devices 120.

Database 102.2 may include one or more storage devices configured to store, delete, update, and/or modify data in accordance with one or more commands received from one or more other back-end components 120, one or more client devices 102.1-102.3, and/or one or more vehicles 104.1-104.3. Moreover, data stored in database 120.2 (and/or one or more other back-end components 120) may be accessed via other back-end components 120, one or more client devices 102.1-102.3, and/or one or more vehicles 104.1-104.3, as needed. For example, database 120.2 may include any suitable combination of one or more storage mediums such as hard disk drives, solid state memory, cloud-based storage devices, etc. In various aspects, database 120.2 may store data in addition to or instead of data stored locally by driver assessment engine 120.1. In doing so, driver assessment engine 120.1, database 120.2, and/or other back-end components 120 may store any suitable type of data used to facilitate the various functionalities of the aspects as described herein.

As will be further discussed in detail below, examples of the data stored among the various components of one or more back-end components 120 may include data identifying the drivers of one or more vehicles, or the vehicles themselves (e.g., vehicles 104.1-104.3), information associated with or otherwise identifying the passengers, telematics data, driver assessments, and/or other information associated with each ridesharing trip. In various aspects, one or more portions of this data may be stored via one or more ridesharing applications and/or information provided via users, one or more client devices 102.1-102.3, and/or one or more vehicles 104.1-104.3. As additional examples, the data stored among the various components of one or more back-end components 120 may include executable code, algorithms, instructions, etc., used to perform functions associated with the various aspects as discussed herein.

Database server 120.3 may be configured as any suitable number and/or type of server, and may be configured to perform substantially similar functions as driver assessment engine 120.1. In some embodiments, driver assessment engine 120.1 and database server 120.3 may be implemented as a single device, and thus both driver assessment engine 120.1 and database server 120.3 may not be present in some aspects. But in other aspects, database server 120.3 may perform dedicated database operations, while driver assessment engine 120.1 performs communication and analytical-based functions.

For example, driver assessment engine 120.1 may handle communications with one or more client computing devices 102.1-102.3, one or more vehicles 104.1-104.3, and/or one or more other back-end components 120. Continuing this example, driver assessment engine 120.1 may perform calculations related to identifying and correlating drivers to their individual sets of telematics data, calculating driver assessments, and transmitting notifications including the calculated driver assessments to the one or more client devices 102.1-102.3 and/or vehicles 104.1-104.3. Further continuing this example, in such a case, database server 120.3 may facilitate the receipt of information and the aggregation of the data associated with each driver's individual data sets from various sources. For example, as new information is received for a particular driver over time, database server 120.3 (or other back-end components 120 such as driver assessment engine 120.1) may append, substitute, update, or otherwise modify the information for each driver so that it remains up-to-date. Additional details associated with these functions are further discussed below.

Figure 2:
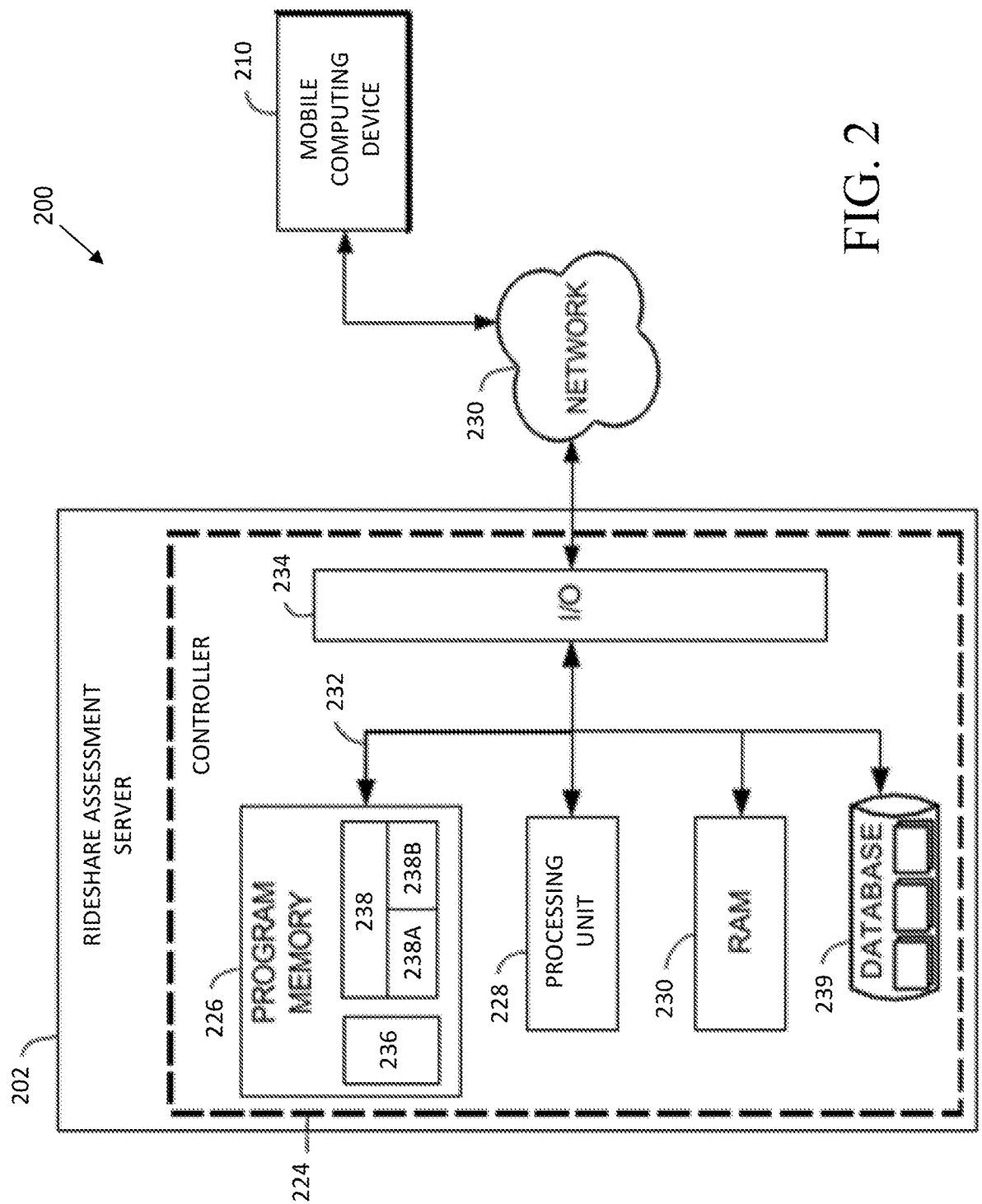
FIG. 2 illustrates a block diagram of an exemplary system 200, in accordance with embodiments of the present disclosure.

An Exemplary Interaction Between a Mobile Computing Device and a Rideshare Assessment Server FIG. 2 illustrates a block diagram of an exemplary system 200, in accordance with embodiments of the present disclosure. In an embodiment, the rideshare assessment server 202, the communication network 230, and the mobile computing device 210 may be implementations of the driver assessment engine 120.1, the communication network 110, and one of the client devices 102.1-102.3, respectively, as shown in FIG. 1. System 200 may include additional, less, or alternate components, including those discussed elsewhere herein.

The rideshare assessment server 202 may communicate with mobile computing device 210 via the communication network 230. To do so, the rideshare assessment server 202 may include a controller 224, which may include a program memory 226, a processing unit 228 (e.g., a microcontroller), a random-access memory (RAM) 230, and/or an input/output (I/O) block 234, each of which may be interconnected via an address/data bus 232. In some embodiments, the controller 224 may also include, or otherwise be communicatively connected to, a database 239 or other suitable local data storage mechanism (e.g., one or more hard disk drives, optical storage drives, solid state storage devices, etc.). The database 239 may include data such as telematics data collected by a mobile computing device during a series of historic ridesharing trips, trip data, and/or other data to facilitate the interaction with users and/or computing devices via the network 230.

It should be appreciated that although FIG. 2 depicts only one processing unit 228, the controller 224 may include multiple processing units 228, which may each include one or more processors. Similarly, the memory of the controller 224 may include multiple RAMs 230 and/or multiple program memories 226. Furthermore, although FIG. 2 depicts the I/O block 234 as a single block, the I/O block 234 may include any suitable number of different types of I/O hardware and/or software. For example, the I/O block 234 may be implemented as one or more communication units and/or modules, and may include any suitable number of transceivers, buffers, ports, antennas, etc., to support data communications. The controller 224 may implement the RAM(s) 230 and/or the program memories 226 as semiconductor memories, magnetically readable memories, and/or optically readable memories, for example.

As shown in FIG. 2, the program memory 226 and/or the RAM 230 may store various applications for execution by the processing unit 228. In various aspects, program memory 226 may be implemented as a non-transitory tangible computer readable media configured to store computer-readable instructions, that when executed by processing unit 228, cause processing unit 228 to perform various acts. For example, program memory 226 may include a user-interface application 236 to provide a user interface to the rideshare assessment server 202, which user interface may, for example, allow the system administrator to configure, troubleshoot, and/or test various aspects of the server's operation.

To provide another example, the program memory 226 may include a rideshare assessment application 238, which is depicted in FIG. 2 as including two modules, 238A and 238B. However, the rideshare assessment application 238 may include any suitable number of modules to accomplish various tasks related to implementation of the rideshare assessment server 202, as further discussed herein. In various embodiments, rideshare assessment application 238 may facilitate the rideshare assessment server 202 determining when a passenger has requested a new ride, identifying the particular driver assigned to that ride, and providing a driver assessment to the passenger based upon this information.

In an embodiment, server application 238 may facilitate the rideshare assessment server 202 providing a driver assessment to a passenger by receiving data (e.g., via I/O block 234) that is transmitted by mobile computing device 210, which may be the same device used by the passenger to request a new ride. In various embodiments, the rideshare assessment application 238 may additionally or alternatively facilitate communications between the rideshare assessment server 202 and one or more ridesharing provider applications and/or computing systems. In such a scenario, the rideshare assessment server 202 may receive information associated with a requested ride as it is placed and/or indicate to the ridesharing provider that a passenger wishes to cancel a ride, as further discussed below.

In an aspect, data correlation module 238A may contain one or more algorithms, logic, and/or executable code to facilitate rideshare assessment server 202 identifying a particular driver's data set from among a series of historic trips with several passengers. To do so, the rideshare assessment server 202 may receive, via network 230, information indicative of one or more historic trips associated with a driver of a vehicle, which may be accessed via one or more back-end components as discussed herein and/or other data sources. This information may be referred to herein as "trip data," and may include, for example, several types of data collected during each driver's ridesharing trips. This trip data may be stored locally in rideshare assessment server 202 and/or stored on other back-end components and retrieved by rideshare assessment server 202 as needed.

For example, the trip data may contain one or more suitable unique identifiers allowing a driver to be uniquely identified, such as the driver's name, the driver's ID number used in accordance with a particular ridesharing application, an internal identifier used by the ridesharing provider, etc. Furthermore, the trip data may include other detailed information associated with each trip, such as route data indicating the origin and destination of each trip and the route taken between the two points. To provide additional examples, the trip data may include time data such as the trip start time (e.g., a time leaving the pickup location), the trip stop time (e.g., a time when arriving at the drop-off location), and duration of each trip. Additionally or alternatively, the trip data may include information identifying each passenger during each trip, the telematics data, the mobile computing device, etc. For ease of explanation, the trip data is further discussed with reference to FIG. 4, which illustrates example records 401-405 of historic ridesharing trips corresponding to five passengers. It will be understood that records 401-405 may be stored in any suitable format to facilitate the various calculations as described herein.

As shown in FIG. 4, each of records 401-405 includes a driver identification, a start time, a stop time, sensor data (i.e., telematics data), and route data. Again, aspects include the trip data including any suitable type of data to facilitate the various embodiments as described herein. Each of the example records 401-405 shown in FIG. 4 is associated with a different passenger, and represents trip data for 5 different trips with various drivers. However, aspects may include data correlation module 238A collecting and aggregating trip data for any suitable number of passengers over any suitable number of historic trips. Because the data contained in the trip data may originate from several different sources, embodiments include processing unit 228 executing instructions stored in data correlation module 238A to aggregate or otherwise organize the trip data in a manner such that each individual driver's trip data may be identified.

For example, the records 401-405 include a driver ID, a start time, a stop time, and route data. This information may be obtained, for example, by accessing data that is generated, stored, and maintained by a particular ridesharing provider. Furthermore, information identifying each passenger may likewise be accessed from the ridesharing provider or transmitted by each passenger's mobile computing device. Still further, the sensor data may also be transmitted from each passenger's mobile computing device, which may collect the sensor data in a manner that may or may not be synchronized to each historic trip.

For example, in some aspects, a passenger's mobile computing device may receive an indication from the rideshare assessment server 202 (or other computing device such as one associated with the ridesharing provider) to indicate when to start and stop collecting telematics data. In such a case, the telematics data is synchronized to each trip, and the rideshare assessment server 202 may correlate the start of each ridesharing trip to each set of telematics data, mobile computing device, passenger, and driver. For example, the rideshare assessment server 202 may match time periods for historic driving trips having known drivers to the time periods associated with collected telematics data from identified passengers. These passengers may also be additionally or alternatively cross-referenced to the rideshare provider's data.

To provide another example, in other aspects, a passenger's mobile computing device may continuously or periodically collect telematics data in an asynchronous manner with respect to the historic trips. In this case, embodiments include the rideshare assessment server 202 correlating timestamps associated with the collected telematics data to the start and stop time of each historic trip. In this way, the telematics data collected by a particular passenger can be filtered such that only the telematics data associated with the duration of each ridesharing trip may be included in that driver's trip data, and subsequently used to assess the driver.

In any event, aspects include the rideshare assessment server 202 correlating the sensor data, which is collected from several passenger's (or driver's) mobile computing devices over several historic ridesharing trips, to each individual driver, passenger, vehicle, and/or trip. For example, with reference to FIG. 4, 5 different passengers had the same driver for 5 separate ridesharing trips. In embodiments, the rideshare assessment server 202 may correlate the sensor data during each historic trip to various individual drivers, and further correlate trip data 401A-405A to the same driver ID 10001. Once a driver's trip data is correlated and identified in this manner, embodiments include calculating a driver assessment, as further discussed below with continued reference to FIG. 4.

In an aspect, driver assessment module 238B may contain one or more algorithms, logic, and/or executable code that facilitates rideshare assessment server 202 calculating a driver assessment and notifying passengers accordingly. To do so, the rideshare assessment server 202 may calculate the driver's assessment by combining one or more ridesharing trips according to the driver's identification. For example, rideshare assessment server 202 may calculate a driver's assessment based on one or more of the start time, the stop time, the sensor data, and/or the route data included in the trip data.

Moreover, the driver's assessment may be based upon any suitable number of trips or other conditions to ensure an accurate assessment of the driver is provided. For example, in some embodiments, a driver's assessment may be calculated after a threshold number of trips have been completed. Continuing this example, if this threshold is four trips, then the driver associated with driver ID 10001 ("driver 10001") would satisfy this condition, allowing a driver assessment to be calculated for driver 10001, but not the other drivers shown in FIG. 4.

In other embodiments, the rideshare assessment server 202 may calculate one or more driver assessments, with a particular one of the driver assessments being provided to a passenger based upon various conditions being met. These embodiments may be particularly useful, for example, to ensure a higher degree of relevance of a driver's assessment for a particular passenger. For example, the rideshare assessment server 202 may be configured to calculate a driver's assessment based on a subset of the historic ride sharing trips.

To provide an illustrative example with reference to FIG. 4, the processing unit 228 may be configured to execute instructions stored in driver assessment module 238B to calculate a driver assessment from a subset of the trip data 401A-405A (i.e., less than all of trip data 401A-405A). This subset of trip data 401A-405A may correspond to, for instance, historic ridesharing trips that are similar to a passenger's scheduled ride based upon one or more aspects, or combinations thereof. For example, the similarity may be based upon an expected distance of a scheduled ride (e.g., routes within a threshold total distance of the expected scheduled ride), a time associated with the start of a scheduled ride (e.g., prior trips starting within a threshold time window of the start of a scheduled ride), an expected duration of the scheduled ride (e.g., prior trips having a total duration within a threshold total duration of the expected duration of the scheduled ride), combinations of one or more such aspects, etc.

To provide another example, the similarity may be based upon various geographical relationships between the passenger requesting a ride and geographic data contained in a driver's trip data. In various embodiments, the geographical relationship may be determined, for example, based upon a determined proximity between one or more portions of a scheduled ride and one or more previous historic trips. To provide an illustrative example, a subset of trip data 401A-405A may be selected for driver assessment by determining a distance from an origin and/or destination within a threshold distance of an origin and/or destination of a scheduled ride. This threshold distance may be a predetermined distance or may be determined, for example, based upon other factors such as whether the passenger requesting the ride is in an urban area versus a rural area. Such embodiments may be particularly useful, for example, when a passenger is being picked up and dropped off at commonly-requested locations, such as between an airport and a city center, for example. In this way, such embodiments may provide more accurate driver assessments by only using trip data from similar historic ridesharing trips that started at the airport and ended at the city center.

To provide another example, the similarity may be based upon specific times of the day or other conditions related to visibility. In various embodiments, the processing unit 228 may execute instructions stored in driver assessment module 238B to calculate separate day and night time driver assessment scores, and provide one or the other to a passenger requesting a ride based upon when the request was received. For example, the rideshare assessment server 202 may be configured to establish time periods associated with daytime and nighttime based upon the sunrise and sunset for each of the historical driving trips. Continuing this example, subsets of trip data 401A-405A may be selected to calculate a day driver assessment associated with trips taken substantially during daylight hours, and a night driver assessment associated with trips taken substantially during evening hours. Further, the rideshare assessment server 202 may be configured to determine which of these is applicable based upon when a new rideshare request is received, and provide that particular driver assessment to the user requesting a ride (e.g., via data transmission to that user's mobile computing device).

Again, the rideshare assessment server 202 may provide the driver assessment to a passenger based upon various conditions and/or similarities. In some embodiments, the rideshare assessment server 202 may facilitate the cancellation of a scheduled ride when this driver assessment is less than (or greater than, depending on the system used) a particular threshold, which may be predetermined or specified by each user, for example. To do so, the rideshare assessment server 202 may transmit data and/or one or more signals (e.g., via I/O block 234) to the ridesharing provider (e.g., via an API services call or other suitable communications with the ridesharing provider's computing system), indicating that a user wishes to cancel a ride.

In other embodiments, the rideshare assessment server 202 may provide the user with an opportunity to cancel the ride by notifying the user accordingly. For example, the rideshare assessment server 202 may transmit data and/or one or more signals to mobile computing device 210 indicating a driver assessment for the driver associated with the requested ride, and that the driver assessment is less than or greater than the aforementioned threshold. A user of the mobile computing device 210 may then decide whether or not to continue with the scheduled ride based on this notification.

In various embodiments, the driver assessment module 238B may facilitate rideshare assessment server 202 calculating a driver assessment in any suitable manner and in accordance with any suitable techniques. For example, the driver assessment module 238B may include a set of rules for determining driver assessments according to sensor data metrics. For example, for sensor data pertaining to vehicle acceleration, the set of rules may specify a threshold acceleration value or range of values for one or more historic trips that results in a driver assessment being reduced. This may include, for example, allocating a weighted number of points to each incident during one or more trips in which threshold acceleration values are exceeded based upon the severity of each incident, and deducting these values from a maximum possible driver assessment. In other words, when the acceleration in the set of sensor data is greater than a first threshold acceleration, a first acceleration score may be assigned, and when the acceleration is also greater than a second threshold acceleration, a second acceleration score (higher than the first acceleration score) may be assigned. In this example, the number and severity of incidents related to the driver accelerating beyond a specified threshold value reduces the driver's assessment, such that a lower numeric assessment is indicative of a "worse" driver assessment, and vise-versa.

Additionally or alternatively, for sensor data pertaining to vehicle velocity, the set of rules may specify a velocity threshold value or range of values for one or more historic trips that results in a driver assessment being reduced. This may include, for example, allocating a weighted number of points to each incident during one or more trips in which the threshold velocity value (or range of values) are exceeded based upon the severity of each incident, and deducting these values from a maximum possible driver assessment. In other words, when the velocity indicated in the set of sensor data is greater than a first threshold velocity, a first velocity score may be assigned, and when the velocity is also greater than a second threshold velocity, a second velocity score (higher than the first acceleration score) may be assigned.

The velocity data may be additionally or alternatively scored based upon the degree in which a posted speed limit has been exceeded and/or a duration of time associated with how long a speed limit was exceeded. For example, an initial threshold velocity may be the posted speed limit on a road, which may be determined, for example, by correlating the vehicle's geographic location to a particular road at a particular time. Continuing this example, the velocity data may be scored by allocating one point for every N miles per hour over the posted speed limit, with an additional point for every M seconds that this was maintained, with N and M being any suitable numbers.

Additionally or alternatively, the set of rules may include additional thresholds and/or consider scores derived from other portions of the sensor data. In various embodiments, any suitable number and/or type of sensor data that is relevant to one or more aspects of operation of a vehicle may be used to calculate the driver assessment. For example, the driver assessment may incorporate a braking score (e.g., indicated via decelerations represented in the accelerometer data) and/or a cornering score (e.g., indicated by g-forces represented in the accelerometer data), which may be calculated in a similar manner using graduated thresholds to indicate the severity of and/or frequency of braking and cornering, respectively, which are scored accordingly. Furthermore, embodiments include combining each of the individual scores (e.g., acceleration, velocity, cornering, braking, etc.) to generate an overall driver assessment.

To provide additional examples, the set of rules may specify other factors that may influence the driver assessment, such as weather, a the type of road, a threshold number of wheel slips and/or skids being sampled within a threshold sampling period, a departure from the road, etc. In other words, the set of rules may compensate for the weather or road conditions such that a driver is not improperly deducted points for unavoidable circumstances.

In various aspects, the individual scores obtained from an analysis of the sensor data may be aggregated and/or combined in any suitable manner, such as by adding the scores, multiplying the scores, averaging the scores, assigning a weight to each score and adding or multiplying the weighted scores, taking a weighted average of the scores, etc., to determine an overall driver assessment. For example, the data in each of the sets of sensor data used to calculate a driver assessment may be weighted for example, such that sensor data for more recent historic trips is weighted more heavily than the other sets of sensor data. To provide another example, each of the sets of sensor data may be weighted equally.

In various embodiments, the driver assessment may be expressed as any suitable quantified system that accurately conveys overall driver safety, or overall how well a driver operates a vehicle during each rideshare trip. For example, the driver assessment may be a numeric score, a number of stars, a percentage or percentile indicating safety compared to other drivers, a category from a set of categories (e.g., "Excellent," "Good," or "Average"), or in any other suitable manner.

To provide an illustrative example, the driver assessment may be a number between 0-100, with 100 indicating the highest level of safety, 0 indicating the lowest level of safety, and 50 indicating a driver of average safety. Continuing this example, a driver may start with an initial driver assessment of 100, which is then deducted for each incident in which a respective sensor score exceeds one or more thresholds, as discussed above. Once a driver assessment rating is determined, embodiments include transmitting this information to the mobile computing device so that the driver assessment rating may be viewed by the user when requesting a ride via a ridesharing application. Additional details regarding the functionality of the mobile computing device are discussed immediately below.

An Exemplary Mobile Computing Device

Figure 3:
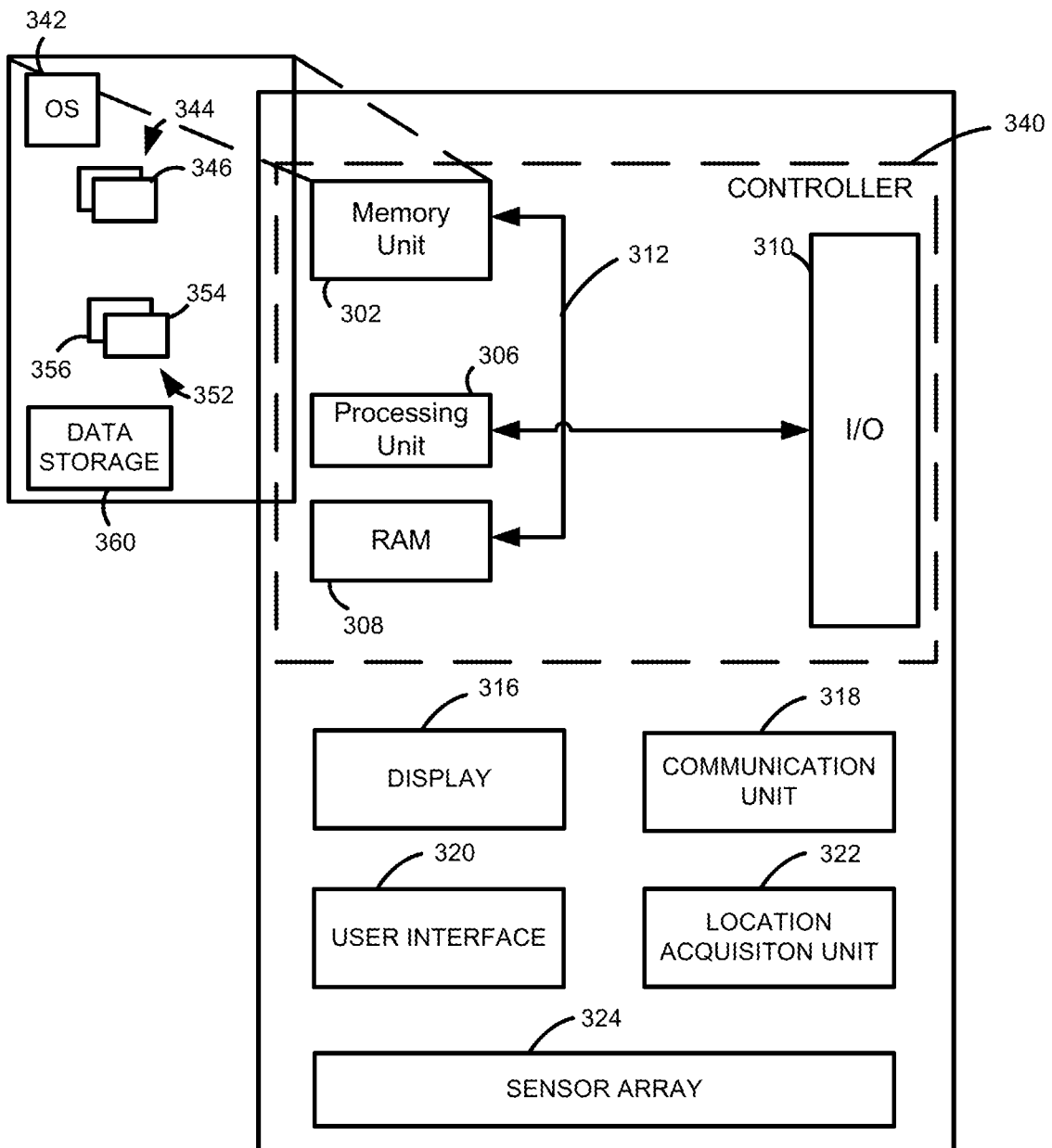
FIG. 3 illustrates a block diagram of an exemplary mobile computing device 300, in accordance with embodiments of the present disclosure.

FIG. 3 illustrates a block diagram of an exemplary mobile computing device 300, in accordance with embodiments of the present disclosure. In the present aspect, mobile computing device 300 may be implemented as any suitable computing device (e.g., client device 102.1 of FIG. 1 or mobile computing device 210 of FIG. 2). In an aspect, mobile computing device 300 may include a controller 340, a display 316, a communication unit 318, a user interface 320, a location acquisition unit 322, and a sensor array 324. System 300 may include additional, less, or alternate components, including those discussed elsewhere herein.

Mobile computing device 300 may be configured to communicate using any suitable number and/or type of communication protocols, such as Wi-Fi, cellular, BLUETOOTH, NFC, RFID, Internet Protocols, etc. For example, mobile computing device 300 may be configured to communicate with various communication networks using a cellular communication protocol to send data to and/or receive data from these components. To this end, communication unit 318 may be configured to facilitate communications between mobile computing device 300 and one or more other devices, such as the various external computing devices as discussed herein (e.g., back-end computing devices 120). As previously discussed with reference to FIGS. 1 and 2, mobile computing device 300 may be configured to communicate with other computing devices in accordance with any suitable number and/or type of communication protocols. Thus, in various aspects, communication unit 330 may be configured to support any suitable number and/or type of communication protocols based upon a particular network and/or device with which mobile computing device 300 is communicating.

Communication unit 318 may also be configured to transmit data and/or to receive data in accordance with any suitable communications schedule. For example, communication unit 318 may be configured to transmit telematics data continuously, every second, every 5 seconds, every 15 seconds, etc. As will be further discussed below, the telematics data may be sampled in accordance with any suitable sampling period. Thus, when transmitted by communications unit 318 in accordance with a recurring schedule, the telematics data may include a log or collection of the telematics data that was sampled since the last data transmission. A suitable communication schedule may be selected based on battery usage of mobile computing device 300, when applicable.

Additionally or alternatively, aspects include communication unit 318 being configured to conditionally send data, which may be particularly advantageous as such conditions may help reduce power usage and prolong battery life. For example, communication unit 318 may be configured to only transmit when telematics data has been sampled since the last telematics data transmission, which will be further discussed below with regards to sensor array 324.

As discussed above, mobile computing device 300 may receive various types of information associated with a scheduled rideshare trip. Thus, mobile computing device 300 may include a display 316, which may be implemented as any suitable type of display, and may facilitate user interaction with mobile computing device 300 in conjunction with user interface 320, to present information to the user. For example, display 316 may be implemented as a capacitive touch screen display, a resistive touch screen display, etc. In various embodiments, display 316 may be configured to work in conjunction with controller 340 to display alerts and/or notifications received from other computing devices, such as information indicative of a driver assessment, notifications regarding a driver's assessment, notifications prompting the user whether to cancel a scheduled ride, indications that a ride has been automatically canceled, etc.

Location acquisition unit 322 may be configured to generate geographic location data utilizing any suitable global positioning techniques. For example, location acquisition unit 322 may communicate with one or more satellites and/or wireless transmitters to determine a location of mobile computing device 300. Location acquisition unit 322 may use "Assisted Global Positioning System" (A-GPS), satellite GPS, or any other suitable global positioning protocol (e.g., the GLONASS system operated by the Russian government, the Galileo system operated by the European Union, etc.) to determine a geographic location of mobile computing device 300.

In one aspect, location acquisition unit 322 may periodically store one or more geographic locations of mobile computing device 300 as geographic location data in any suitable portion of memory utilized by mobile computing device 300 (e.g., memory unit 302, RAM 308, etc.) and/or to another device (e.g., an external computing device). In this way, location acquisition unit 322 may sample the location of mobile computing device 300 in accordance with any suitable sampling rate (e.g., every 5 seconds, 10 seconds, 30 seconds, etc.) and store this geographic location data over time. In this way, the geographic location data may track the position of mobile computing device 300, and thus the vehicle in which it is travelling.

Again, this geographic location data may be contained in a telematics data transmission or otherwise be referred to herein as part of the telematics data. In one example, the location acquisition unit 322 may be configured to determine a geographic location associated a pickup location of the rideshare trip, a drop-off location of the rideshare trip, a duration of the rideshare trip, and route data of the rideshare trip. This information may be transmitted to one or more external devices and subsequently associated with the driver's trip data, as discussed above with reference to FIG. 4.

User-interface 320 may be configured to facilitate user interaction with mobile computing device 300. Thus, user-interface 320 may be implemented as any suitable device configured to collect user input, such as a "soft" keyboard displayed on display 316 of mobile computing device 300.

Sensor array 324 may be configured to measure any suitable number and/or type of sensor metrics, which may be transmitted as part of the telematics data, for example. In one aspect, sensor array 324 may be implemented as one or more sensors positioned to determine various metrics associated with movement, force, environmental conditions, etc., experienced by mobile computing device 300, and therefore indicative of sensor metrics applicable to a vehicle in which mobile computing device 300 is located. Again, these sensor metrics may include a velocity, force, heading, and/or direction, acceleration, braking, cornering, etc., associated with movements of a vehicle in which mobile computing device 300 is located.

To generate one or more sensor metrics, sensor array 324 may include any suitable number and/or type of sensors. For example, sensor array 324 may include one or more cameras, accelerometers, gyroscopes, magnetometers, barometers, thermometers, proximity sensors, light sensors, Hall-Effect sensors, etc. In aspects in which sensor array 324 includes one or more accelerometers, sensor array 324 may be configured to measure and/or collect accelerometer metric values utilizing an X-axis, Y-axis, and Z-axis accelerometer. In accordance with such aspects, sensor array 324 may measure sensor metric values as a three-dimensional accelerometer vector that represents the movement of mobile computing device 300 in three dimensional space by combining the outputs of the X-axis, Y-axis, and Z-axis accelerometers using any suitable techniques.

In various aspects, sensor array 324 may additionally or alternatively communicate with other portions of mobile computing device 300 to obtain one or more sensor metrics even though these sensor metrics may not be measured by one or more sensors that are part of sensor array 324. For example, sensor array 324 may communicate with one or more of location acquisition unit 322, communication unit 318, and/or controller 340 to obtain data such as timestamps synchronized to the sampling of one or more sensor metrics (which may be measured to within hundredths of a second or smaller resolutions), geographic location data (and correlated timestamps thereof), a velocity based upon changes in the geographic location data over time, a battery level of mobile computing device 300, whether mobile computing device 300 is being handled or otherwise in use, an operating status of mobile computing device 300 (e.g., whether mobile computing device 300 is unlocked and thus in use), etc.

In various aspects, sensor array 324 may base timestamps upon any suitable clock source, such as one utilized by location acquisition unit 320 for GNSS functions. The timestamps may be, for example, recorded or logged as various data is sampled to be synchronized to the sampling of one or more sensor metrics (which may be measured to within hundredths of a second or a smaller resolution).

In some embodiments, sensor array 324 may be configured to sample the one or more sensor metrics in accordance with any suitable sampling rate and/or based upon one or more trigger conditions being satisfied. For example, sensor array 324 may be configured to sample sensor metrics at any suitable sampling rate (e.g., 5 Hz, 15 Hz, 30 Hz, etc.), which may be the same sampling rate at which other sensor metrics are sampled or different sampling rates.

To provide another example, the one or more aforementioned trigger conditions may cause mobile computing device 300 to begin collecting and/or transmitting telematics data. For example, mobile computing device 300 may collect and/or transmit telematics data upon detecting that it positioned within a vehicle. This detection may occur, for example, via mobile computing device 300 determining (e.g., via sensor array 324 and/or location acquisition unit 322), when it is travelling above a threshold velocity that indicates it is likely located within a vehicle. Aspects include any suitable number of conditions, upon being satisfied, triggering mobile computing device 300 to start collecting telematics data via sensor array 326.

Again, the telematics data broadcasted by mobile computing device 300 may include one or more sensor metrics. However, the telematics data may additionally or alternatively include other external data that may be relevant in determining a driver assessment during a rideshare trip. For example, the telematics data may include external data such as speed limit data correlated to a road upon which mobile computing device 300 is located (and thus the vehicle in which it is travelling), an indication of a type of road, weather conditions, etc.

In some aspects, mobile computing device 300 may obtain this external data by referencing the geographic location data to locally stored data (e.g., data stored in data storage 360) and transmitting this data appended to or otherwise included with the other information (e.g., sensor metrics) as part of the telematics data. In other aspects, the device receiving the telematics data (e.g., an external computing device) may generate the external data locally or via communications with yet another device. As will be further discussed herein, this external data may further assist in the calculation of a driver assessment.

In one aspect, controller 340 may include a memory unit 302, which may include program memory, a processing unit 306, a random-access memory (RAM) 308, and/or an input/output (I/O) block 310, each of which may be interconnected via an address/data bus 312. Although FIG. 3 depicts controller 340 as including one memory unit 302, one processing unit 306, and one RAM 308, controller 340 may include any suitable number of such components. Furthermore, although FIG. 3 depicts controller 340 as having a single I/O block 310, controller 340 may include any suitable number and/or types of I/O blocks 310.

In various aspects, controller 340 may implement RAM(s) 308 and memory unit 302 as any suitable type of memory or combination of different memory types, such as volatile (e.g., a random access memory (RAM)), or non-volatile memory (e.g., battery-backed RAM, FLASH, etc.). To provide additional examples, controller 340 may implement RAM(s) 308 and memory unit 302 as non-transitory computer readable memories, semiconductor memories, magnetically readable memories, optically readable memories, etc. In an aspect, memory unit 302 may be configured to store instructions executable by processing unit 306 and/or controller 340. These instructions may include machine readable instructions that, when executed by processing unit 306, cause processing unit 306 (and thus mobile computing device 300) to perform various acts.

To do so, controller 340 (and/or processing unit 306) may be implemented as any suitable type and/or number of processors, such as a host processor for the relevant device in which mobile computing device 300 is implemented, for example. In some aspects, controller 340 (and/or processing unit 306) may be configured to communicate with additional data storage mechanisms that are not shown in FIG. 3 for purposes of brevity (e.g., one or more hard disk drives, optical storage drives, solid state storage devices, etc.).

Memory unit 302 may additionally or alternatively store data used in conjunction with one or more functions performed by mobile computing device 300 to facilitate the interaction between mobile computing device 300 and one or more other devices. For example, memory unit 302 may store one or more programs, applications, algorithms, etc., that when executed by controller 340 and/or processing unit 306, facilitate the interaction between mobile computing device 300, one or more communication networks (e.g., communication network 110, as shown in FIG. 1), one or more external computing devices (e.g., back-end computing devices 120, as shown in FIG. 1), etc. To do so, controller 340 and/or processing unit 306 may be configured to communicate with other components of controller 340 and/or other components of mobile computing device 300 such as, for example, display 316, communication unit 318, user interface 320, location acquisition unit 322, and/or sensor array 324 to send data to and/or to receive data from one or more of these components.

Memory unit 302 may include an operating system 342, one or more software applications 344, and one or more software routines 352. For example, operating system 342 may be implemented as any suitable operating system platform depending upon the particular implementation of mobile computing device 300. Furthermore, memory unit 302 may store other data portions that may be read from and written to by processing unit 306, such as data storage 360, for example. For instance, data storage 360 may store data such as application data for the one or more software applications 344, routine data for the one or more software routines 352, geographic location data, telematics data, etc.

In some aspects, software applications 344 and/or software routines 352 may reside in program memory 302 as default applications that may be bundled together with the OS of mobile computing device 300. In other aspects, software applications 344 and/or software routines 352 may be installed on mobile computing device 300 as one or more downloads, such as an executable package installation file downloaded from a suitable application store via a connection to the Internet.

In one embodiment, software applications 344 may include a rideshare assessment application 346, which may be implemented as a series of machine-readable instructions for performing the various tasks associated with executing one or more embodiments described herein. In one aspect, rideshare assessment application 346 may cooperate with one or more other hardware components (e.g., sensor array 324) and/or software installed on mobile computing device 300 (e.g., software routines 352) to facilitate these functions.

In various embodiments, the rideshare assessment application 346 may facilitate mobile computing device 300 performing a variety of functions related to the overall operation of the driver assessment system as described herein. For example, the rideshare assessment application 346 may facilitate mobile computing device 300 calculating driver assessments, determining a geographic location of mobile computing device 300 (e.g., via location acquisition unit 322), monitoring, measuring, generating, and/or collecting telematics data (e.g., via sensor array 324), transmitting the telematics data to one or more external computing devices, receiving geographic location data from another computing device, generating and/or transmitting one or more signals to a ridesharing computing system to cancel a requested scheduled ride, receiving user input, facilitating communications between mobile computing device 300 and one or more other devices in conjunction with communication unit 318, etc.

Additionally or alternatively, rideshare assessment application 346 may allow for mobile computing device 300 to interact with or otherwise receive data related to one or more separate ridesharing applications that may be installed on or work in conjunction with the mobile computing device 300. For example, a user may schedule a ride with a ridesharing provider using a separate application, which is not shown in FIG. 3 for purposes of brevity. In various aspects, the rideshare assessment application 346 may facilitate mobile computing device 300 accessing information provided by the rideshare provider in response to this request, which may include information such as when the request was made, information identifying the driver for the requested trip, information identifying the passenger (i.e., the user sending the request), information identifying when the trip started and ended, information associated with an overall duration of the trip, a pickup location, a drop-off location, a duration of the rideshare trip, the route, a location associated with where the request was made, etc.

In some of these aspects, the information received from the rideshare provider may be accessed locally. For instance, rideshare assessment application 346 may enable access to various portions of memory unit 302 and/or RAM 308 to retrieve information provided from the rideshare provider, as discussed above.

In other aspects, rideshare assessment application 346 may facilitate mobile computing device 300 remotely accessing this information from one or more external computing devices that may be associated with the rideshare providers. Continuing this example, this remote access may include mobile computing device 300 performing an API services call to one or more servers where the rideshare provider stores this information.

In any event, aspects include mobile computing device obtaining any suitable type of information provided by the rideshare provider, such as the various trip data discussed above with reference to FIGS. 2 and 4, for example. This information may then be used for various purposes. For example, if information such as a trip start time and end time is received in real-time, mobile computing device 300 may use this information as one of the trigger conditions to start collecting telematics data (i.e., sensor data) via sensor array 324. For example, rideshare assessment application 346 may cause sensor array 324 to begin sampling sensor data when a ride has started and to stop sampling sensor data upon completion of the trip. Thus, when the telematics data is transmitted, the external computing device receiving this data (e.g., rideshare assessment server 202) may correlate the passenger and driver to the sensor data associated with that particular trip.

In an embodiment, software routines 352 may include a driver assessment routine 354. In an aspect, rideshare assessment application 346 may work in conjunction with the driver assessment routine 354 to calculate a driver assessment. To do so, mobile computing device may communicate with one or more external computing devices to obtain the trip data for one or more drivers, as discussed above with reference to FIGS. 2 and 4, for example. However, in some aspects, mobile computing device 300 may use locally-collected telematics data instead of the sensor data stored by the rideshare assessment server 202, as shown in FIG. 4. In any event, once the trip data is received and correlated to a particular driver, embodiments include driver assessment routine 354 facilitating the calculation of a driver assessment in a substantially similar or identical manner as discussed above with reference to the rideshare assessment server 202.

In other words, the driver assessment may be calculated locally via mobile computing device 300 or received from another external computing device that performs this calculation (e.g., rideshare assessment server 202). When calculated locally via mobile computing device 300, the driver assessment may be transmitted (e.g., via communication unit 318) to the external computing device, where it may be stored and provided to future passengers as discussed above with reference to FIG. 2. As a result, aspects include each passenger's mobile computing device calculating and transmitting their respective driver scores after each ride has been completed, advantageously reducing the processing resources and bandwidth that would otherwise be required by the rideshare assessment server. In an embodiment, software routines 352 may include a rideshare notification routine 356. In an aspect, rideshare assessment application 346 may work in conjunction with the rideshare notification routine 356 to provide various rideshare notifications to the user requesting a ride. For example, as discussed above, a calculated driver assessment may be transmitted to a user requesting a ride via a ridesharing provider. This driver assessment may be one of several based upon various conditions such as, for example, the user's location, when the request is made, etc., as discussed above with reference to the rideshare assessment server 202. In an embodiment, the rideshare notification routine 356 may facilitate the user specifying the type of driver score to be provided when a new rideshare trip is requested. For example, a user may interact with user interface 320 to specify whether a specific type of driver assessment should be returned and displayed when each new ride request is made.

To provide another example, rideshare notification routine 356 may facilitate mobile computing device conveying information related to a driver assessment to the user via display 316. For instance, assume that a user requests a ridesharing trip via a ridesharing application, which causes mobile computing device to notify an external computing device that such a request has been made (e.g., a computing device associated with the rideshare provider and/or rideshare assessment server 202). The rideshare assessment server 202 may then calculate the driver assessment for the current driver, as discussed above, and transmit information to the mobile computing device 300 indicative of that driver's assessment, such as a star rating, a numeric score, etc. This information may then be presented on display 316 in any suitable manner based upon how this information is received from the external computing device. For example, the mobile computing device 300 may receive this information as a text message, an email, a push notification, as information displayed as part of the execution of rideshare assessment application 346, as information integrated into the separate rideshare application used to request the ride, etc.

To provide yet another example, upon presenting the driver assessment, rideshare notification routine 356 may facilitate mobile computing device 300 providing a user with options to cancel the current trip via user interaction. In various embodiments, this may be performed via one or more interactive prompts, icons, etc., that a user may select upon viewing the driver assessment. In some embodiments, this option may only occur when the driver assessment is above or below a specified threshold value (e.g., a user-specified threshold), while in other embodiments the user may be presented the option to cancel each time the driver's assessment is received and displayed. Again, upon a user selecting the option to cancel, rideshare notification routine 356 may facilitate mobile computing device 300 transmitting data to a computing system associated with the rideshare provider. Alternatively, rideshare notification routine 356 may facilitate mobile computing device 300 communicating with the separate ridesharing application installed on mobile computing device 300 to cause the ridesharing application to send this indication in a similar manner as if the user requested a cancellation directly via the ridesharing application.

An Exemplary Computer-Implemented Method for Assessing Driver Performance

Figure 5:
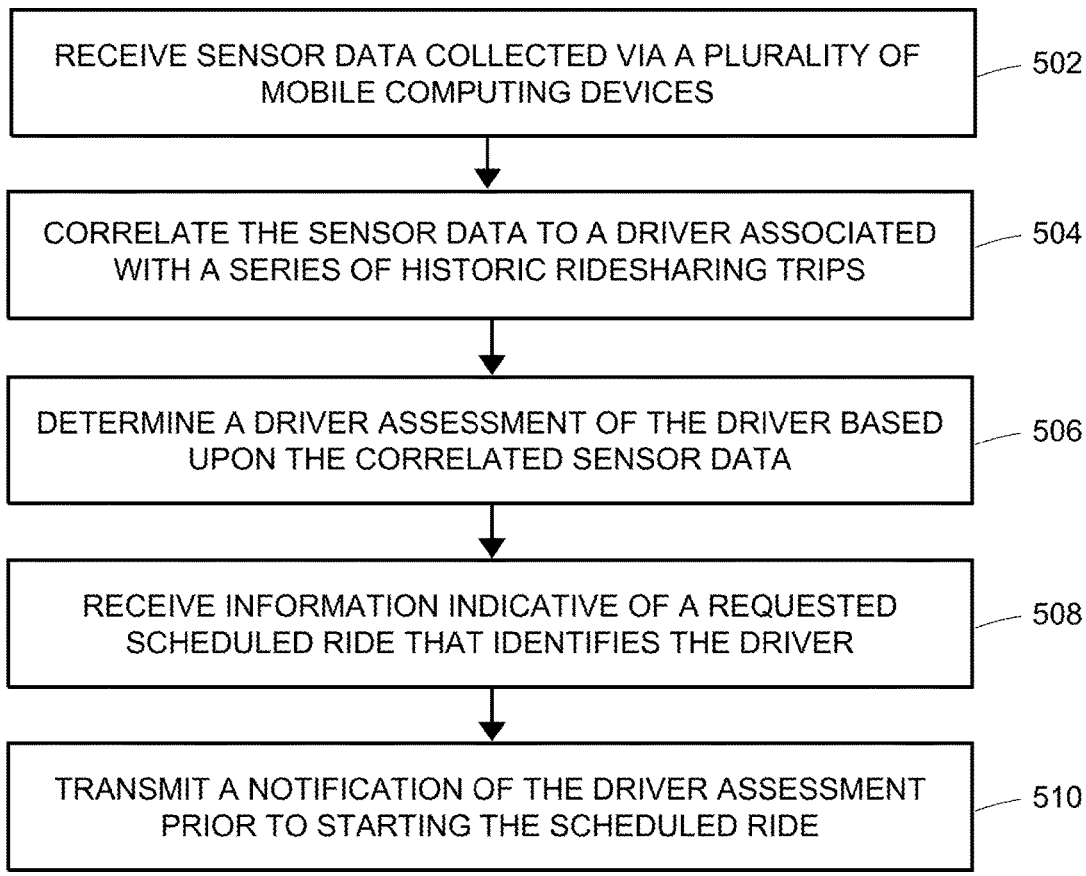
FIG. 5 illustrates an exemplary flow diagram, in accordance with embodiments of the present disclosure.

FIG. 5 illustrates an exemplary flow diagram, in accordance with embodiments of the present disclosure. Although the blocks in FIG. 5 are illustrated in a sequential order, the blocks may in some instance be performed in parallel, and/or in a different order than those described therein. Also, the various blocks may be combined into fewer blocks, divided into additional blocks, and/or removed based upon the desired implementation.

In the present aspects, one or more portions of method 500 (or the entire method 500) may be implemented by any suitable computing device, and one or more portions of method 500 may be performed by more than one suitable computing device in combination with one another. For example, one or more portions of method 500 may be performed by rideshare assessment server 202 and/or mobile computing device 300, as shown in FIGS. 2 and 3, respectively. In one aspect, method 500 may be performed by any suitable combination of one or more processors, instructions, applications, programs, algorithms, routines, etc.

For example, method 500 may be performed via processing unit 228 executing instructions stored in program memory 226, as shown in FIG. 2, in conjunction with data collected, received, and/or generated via one or more other data sources (e.g., one or more mobile computing devices, one or more back-end computing devices, data obtained via the rideshare provider, etc.). To provide another example, method 500 may be performed via processing unit 306 executing instructions stored in memory unit 302, as shown in FIG. 3, in conjunction with locally generated data and/or data that is accessed, collected, and/or received from one or more other external computing devices, as discussed herein.

Method 500 may start when one or more processors receives sensor data collected via a plurality of mobile computing devices (block 502). This data may include, for example, data retrieved from one or more client devices such as telematics data, which indicates one or more aspects of vehicle operation during each of the series of historic ridesharing trips when rideshare passengers were being driven by the driver, as discussed herein (block 502).

Method 500 may include one or more processors correlating the sensor data to a driver associated with each of a series of historic ridesharing trips (block 504). This may include, for example, identifying individual drivers from among sets of trip data associated with several ridesharing trips, as discussed herein (block 504).

Method 500 may include one or more processors determining a driver assessment of the driver based on the correlated (block 504) sensor data (block 506). This may include, for example calculating the driver assessment as a numeric score, a star rating, etc., based upon the telematics data and/or other factors, as discussed herein (block 506).

Method 500 may include one or more processors receiving information indicative of a requested scheduled ride that identifies the driver (block 508). This may include, for example, receiving data from the mobile computing device requesting the rideshare trip (block 508). This may also include, for example, receiving data from a ridesharing provider's computing system (block 508). Again, the driver may be identified in any suitable manner such as via a unique identifier, as discussed herein (block 508)

Method 500 may include one or more processors transmitting a notification of the driver assessment prior to a start of the scheduled ride (block 510). This may include, for example, transmitting data to the mobile computing device requesting the rideshare trip, the data corresponding to a particular driver assessment based upon one or more conditions, as discussed herein (block 510). Upon receiving the transmitted driver assessment, the mobile computing device that requested the rideshare trip may further display the driver assessment, allowing the user to choose to continue or cancel the ride.

Technical Advantages

The aspects described herein may be implemented as part of one or more computer components, such as a client device and/or one or more back-end components as described herein. Furthermore, the aspects described herein may be implemented as part of a computer network architecture that facilitates communications between various other devices and/or components. Thus, the aspects described herein address and solve issues of a technical nature that are necessarily rooted in computer technology.

For instance, aspects include analyzing various sources of data to match a driver to his or her own sets of trip data that are collected over several trips, and to use information contained in this trip data to calculate one or more driver assessments. These driver assessments may then be provided to future users when requesting rides with the same driver. In doing so, the aspects overcome issues associated with the inconvenience of manual and/or unnecessary monitoring of such data by automatically collecting telematics data, calculating driver assessments, and determining when to provide this information to future users. Without the improvements suggested herein, additional time, processing resources, and memory usage would be required to achieve these results.

Furthermore, the embodiments described herein function to receive data from several data sources over time, to aggregate the collected data, and to dynamically update trip data and/or driver assessments in real time or near real-time as new data is collected from the various aforementioned sources. As a result, the process improves upon existing technologies by updating information and providing objective driver assessments in a manner that would otherwise be infeasible or impractical. Moreover, the embodiments provided herein allow for flexibility regarding the specific types of driver assessment scores to be received by each future user.

Still further, the embodiments provided herein recognize that existing rating systems are subjective rating systems, not objective rating systems. To address this need, the embodiments described herein address and overcome issues of a technical nature to accurately and efficiently identify drivers, match drivers to their sets of trip data, and calculate one or more driver assessments. Due to these improvements, the embodiments solve computer-related issues regarding the use of telematics data in the context of a ridesharing system.

The aspects also improve upon computer technology by requiring fewer calculations due to the increased efficiency provided, for example, via the combination of processes, steps, elements, and/or components described herein. In other words, the specific combination of elements and/or components working in conjunction with one another (e.g., via networked communications) in and of itself represents a significant improvement to the overall technology involved. To be sure, the applications described herein produce a tangible improvement over conventional rating systems, which do not correlate acquired sensor data to individual drivers, and therefore fail to provide objective rating systems that accurately indicate driving safety and operation.

Additional Considerations

This detailed description is to be construed as exemplary only and does not describe every possible embodiment, as describing every possible embodiment would be impractical, if not impossible. One may be implement numerous alternate embodiments, using either current technology or technology developed after the filing date of this application.

Furthermore, although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some exemplary embodiments, the one or more processors or processor-implemented modules may be located in a single geographic location (e.g., within a vehicle, within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

The various systems and methods described herein are directed to an improvement to computer functionality, and improve the functioning of conventional computers, as described, for example, in the "Technical Advantages" Section and elsewhere herein.

What is claimed is:

1. A rideshare assessment system, comprising:
   a communication unit configured to receive sensor data collected, from a plurality of mobile computing devices associated with a plurality of rideshare passengers, during a plurality of ridesharing trips driven by a driver; and
   a processor coupled to the communication unit and configured to:
      determine a first driver assessment corresponding to the driver based at least in part upon the sensor data, the first driver assessment indicating one or more aspects of vehicle operation during one or more ridesharing trips driven during a first predetermined time period; and
      determine a second driver assessment corresponding to the driver based at least in part upon the sensor data, the second driver assessment indicating one or more aspects of vehicle operation during one or more ridesharing trips driven during a second predetermined time period, the second predetermined time period being different from the first predetermined time period;
   wherein the communication unit is further configured to:
      receive information indicative of a scheduled ride with the driver, the information identifying a start time of the scheduled ride;
      transmit the first driver assessment if the start time is within the first predetermined time period; and
      transmit the second driver assessment if the start time is within the second predetermined time period.

2. The rideshare assessment system of claim 1, wherein each ridesharing trip of the plurality of ridesharing trips is requested by a rideshare passenger of the plurality of rideshare passengers via a mobile computing device of the plurality of mobile computing devices, the each ridesharing trip having been transmitted to an external computing device associated with a ridesharing provider.

3. The rideshare assessment system of claim 1, wherein the sensor data includes at least one selected from a group consisting of velocity data, acceleration data, cornering data, and braking data.

4. A computer-implemented method for assessing ridesharing driving performance, the method comprising:
   receiving sensor data collected, from a plurality of mobile computing devices associated with a plurality of rideshare passengers, during a plurality of ridesharing trips driven by a driver;
   determining a first driver assessment corresponding to the driver based at least in part upon the sensor data, the first driver assessment indicates one or more aspects of vehicle operation of a vehicle during one or more first ridesharing trips driven during a first predetermined time period;
   determining a second driver assessment corresponding to the driver based at least in part upon the sensor data, the second driver assessment indicates one or more aspects of vehicle operation of the vehicle during one or more second ridesharing trips driven during a second predetermined time period, the second predetermined time period being different from the first predetermined time period;
   receiving information indicative of a scheduled ride with the driver, the information identifying a start time of the scheduled ride; and
   transmitting the first driver assessment or the second driver assessment based on the start time of the scheduled ride.

5. The computer-implemented method of claim 4, wherein the sensor data includes at least one selected from a group consisting of velocity data, acceleration data, cornering data, and braking data.

6. The computer-implemented method of claim 4, further comprising:
   updating at least one of the first driver assessment or the second driver assessment based at least in part upon a subset of the plurality of ridesharing trips similar to the scheduled ride in at least one of:
      an expected distance of the scheduled ride,
      a time associated with a start of the scheduled ride, or
      an expected duration of the scheduled ride.

7. The computer-implemented method of claim 4, further comprising:
   determining a first distance threshold from an origin of the scheduled ride and a second distance threshold from a destination of the scheduled ride;
   determining a subset of the plurality of ridesharing trips with at least one of an origin within the first distance threshold or a destination within the second distance threshold; and
   updating at least one of the first driver assessment and the second driver assessment based at least in part upon the subset of the plurality of ridesharing trips.

8. The computer-implemented method of claim 4, further comprising:
   determining whether one of the first driver assessment and the second driver assessment satisfies a threshold score; and
   transmitting, in response to one of the first driver assessment and the second driver assessment not satisfying the threshold score, a ride cancellation signal.

9. The computer-implemented method of claim 8, wherein the transmitting the ride cancellation signal includes transmitting the ride cancellation signal to a computing system associated with a ridesharing provider for causing the scheduled ride to be canceled.

10. The computer-implemented method of claim 9, wherein the transmitting the ride cancellation signal includes transmitting the ride cancellation signal to a mobile computing device associated with a user requesting the scheduled ride for causing the mobile computing device to provide a notification to the user to cancel the scheduled ride.

11. The computer-implemented method of claim 4, wherein the determining the first driver assessment includes:
comparing acceleration data of the vehicle during the plurality of ridesharing trips to one or more acceleration thresholds to generate a comparison; and
determining the first driver assessment based at least in part on the comparison.

12. The computer-implemented method of claim 4, wherein the determining the second driver assessment includes:
comparing acceleration data of the vehicle during the plurality of ridesharing trips to one or more acceleration thresholds to generate a comparison; and
determining the second driver assessment based at least in part on the comparison.

13. The computer-implemented method of claim 4, wherein the determining the first driver assessment includes:
comparing velocity data of the vehicle during the plurality of ridesharing trips to one or more velocity thresholds to generate a comparison; and
determining the first driver assessment based at least in part on the comparison.

14. The computer-implemented method of claim 4, wherein the determining the second driver assessment includes:
comparing velocity data of the vehicle during the plurality of ridesharing trips to one or more velocity thresholds to generate a comparison; and
determining the second driver assessment based at least in part on the comparison.

15. The computer-implemented method of claim 4, wherein the determining the first driver assessment includes:
determining one or more durations of time associated with when the driver was driving in excess of a posted speed limit during the plurality of ridesharing trips; and
determining the first driver assessment based at least in part on the one or more durations of time.

16. The computer-implemented method of claim 4, wherein the determining the second driver assessment includes:
determining one or more durations of time associated with when the driver was driving in excess of a posted speed limit during the plurality of ridesharing trips; and
determining the second driver assessment based at least in part on the one or more durations of time.

17. A computer-implemented method for assessing ridesharing driving performance, the method comprising:
receiving sensor data collected, from a plurality of mobile computing devices associated with a plurality of rideshare passengers, during a plurality of ridesharing trips driven by a driver;
determining a plurality of driver assessments corresponding to the driver based at least in part upon the sensor data, each driver assessment of the plurality of driver assessments indicates one or more aspects of vehicle operation during one or more ridesharing trips driven during a respective predetermined time period;
receiving information indicative of a scheduled ride with the driver, the information identifying a start time of the scheduled ride; and
transmitting one of the plurality of driver assessments based on the start time of the scheduled ride.

18. The computer-implemented method of claim 17, wherein the sensor data includes at least one selected from a group consisting of velocity data, acceleration data, cornering data, and braking data.

19. The computer-implemented method of claim 17, further comprising:
updating a driver assessment of the plurality of driver assessments based at least in part upon a subset of the plurality of ridesharing trips similar to the scheduled ride in at least one selected from a group consisting of:
an expected distance of the scheduled ride,
a time associated with the start time of the scheduled ride, and
an expected duration of the scheduled ride.

20. The computer-implemented method of claim 17, further comprising:
determining a first distance threshold from an origin of the scheduled ride and a second distance threshold from a destination of the scheduled ride;
determining a subset of the plurality of ridesharing trips with at least one of an origin within the first distance threshold or a destination within the second distance threshold; and
updating a driver assessment of the plurality of driver assessments based at least in part upon the subset of the plurality of ridesharing trips.

21. The computer-implemented method of claim 17, further comprising:
determining whether a driver assessment of the plurality of driver assessments satisfies a threshold score; and
transmitting, in response to the driver assessment not satisfying the threshold score, a ride cancellation signal.

22. A computer-implemented method for assessing ridesharing driving performance, the method comprising:
receiving sensor data collected, from a plurality of mobile computing devices associated with a plurality of rideshare passengers, during a plurality of ridesharing trips driven by a driver;
determining a plurality of driver assessments corresponding to the driver based at least in part upon the sensor data, each driver assessment of the plurality of driver assessments indicates one or more aspects of vehicle operation during one or more ridesharing trips driven during a respective predetermined time period;
receiving information indicative of a scheduled ride with the driver, the information identifying a time of the scheduled ride; and
transmitting one of the plurality of driver assessments based on the time of the scheduled ride.

23. The computer-implemented method of claim 22, wherein the sensor data includes at least one selected from a group consisting of velocity data, acceleration data, cornering data, and braking data.

24. The computer-implemented method of claim 22, further comprising:
updating a driver assessment of the plurality of driver assessments based at least in part upon a subset of the plurality of ridesharing trips similar to the scheduled ride in at least one selected from a group consisting of:
an expected distance of the scheduled ride,
a time associated with the time of the scheduled ride, and
an expected duration of the scheduled ride.

25. The computer-implemented method of claim 22, further comprising:
determining a first distance threshold from an origin of the scheduled ride and a second distance threshold from a destination of the scheduled ride;

determining a subset of the plurality of ridesharing trips with at least one of an origin within the first distance threshold or a destination within the second distance threshold; and updating a driver assessment of the plurality of driver assessments based at least in part upon the subset of the plurality of ridesharing trips.

26. The computer-implemented method of claim 22, further comprising:

determining whether a driver assessment of the plurality of driver assessments satisfies a threshold score; and transmitting, in response to the driver assessment not satisfying the threshold score, a ride cancellation signal.

* * * * *